United States Patent
Zirilli et al.

(10) Patent No.: US 10,261,286 B2
(45) Date of Patent: Apr. 16, 2019

(54) DIGITAL MICROMIRROR DEVICE COOLING SYSTEM AND METHOD

(71) Applicant: Xerox Corporation, Norwalk, CT (US)

(72) Inventors: Francisco Zirilli, Penfield, NY (US); Michael B. Monahan, Webster, NY (US); Jeffrey J. Bradway, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 27 days.

(21) Appl. No.: 15/652,913

(22) Filed: Jul. 18, 2017

(65) Prior Publication Data
US 2019/0025542 A1    Jan. 24, 2019

(51) Int. Cl.
*G02B 26/08* (2006.01)
*G02B 7/18* (2006.01)
*G03B 21/00* (2006.01)

(52) U.S. Cl.
CPC ....... *G02B 7/1815* (2013.01); *G02B 26/0833* (2013.01); *G03B 21/008* (2013.01)

(58) Field of Classification Search
CPC . G02B 7/1815; G02B 26/0833; G03B 21/008
USPC ..................................................... 359/223.1
See application file for complete search history.

(56) References Cited

U.S. PATENT DOCUMENTS

| | | | |
|---|---|---|---|
| 6,523,353 B2 | 2/2003 | Evans et al. | |
| 6,617,792 B2 | 9/2003 | Hughes et al. | |
| 7,000,417 B2* | 2/2006 | Evans | F25B 21/02 348/E5.142 |
| 7,796,383 B2 | 9/2010 | Kavanagh | |
| 8,508,791 B1 | 8/2013 | Paul et al. | |
| 2007/0029654 A1* | 2/2007 | Sunohara | B81C 1/00301 257/678 |
| 2010/0200777 A1* | 8/2010 | Hauf | G02B 7/1815 250/504 R |
| 2016/0136851 A1* | 5/2016 | Campbell | H05K 7/20436 264/279 |

OTHER PUBLICATIONS

Atwood et al., U.S. Appl. No. 15/275,633, filed Sep. 26, 2016.
Adiletta et al., U.S. Appl. No. 15/299,850, filed Oct. 21, 2016.
Zirilli et al., U.S. Appl. No. 15/342,579, filed Nov. 3, 2016.
Leighton et al., U.S. Appl. No. 15/384,411, filed Dec. 20, 2016.
Dergham et al., U.S. Appl. No. 15/450,745, filed Mar. 6, 2017.

* cited by examiner

*Primary Examiner* — Euncha P Cherry
(74) *Attorney, Agent, or Firm* — Caesar Rivise, PC

(57) ABSTRACT

A DMD chip includes a micromirror array mounted on a very thin silicon wafer attached to a cooling system integrated within the DMD chip. The cooling system includes a fluid cooled heat sink with a cooling channel. Fluid coolant may be pumped through the channel and out of the DMD to remove heat from the silicon substrate and the micromirror array. The micromirror array may be hermetically sealed within the housing, with the heat sink located between the micromirror array and a back wall of the housing, with both the heat sink and the array within the interior of the housing.

20 Claims, 12 Drawing Sheets

DIGITAL MICROMIRROR DEVICE COOLING SYSTEM AND METHOD

FIELD OF DISCLOSURE

This invention relates generally to printers and optical components within certain laser imaging modules and, more particularly, to an apparatus and method for cooling a Digital Micromirror Device (DMD).

BACKGROUND

High power laser imaging is increasingly employed in modern printing operations. One example of a laser imaging technique utilized in these operations is offset lithography. In a typical lithographic process, a printing plate (e.g., a flat plate, an outer surface of a cylinder, belt) can be configured with "image regions" formed of, for example, hydrophobic and oleophilic material, and "non-image regions" formed of a hydrophilic material. Such image regions correspond to areas on a print media that are occupied by a printing or a marking material such as ink, whereas the non-image regions correspond to the areas on the print media not occupied by the marking material.

Variable data lithography (also referred to as digital lithography or digital offset) utilized in printing processes typically begins with a fountain solution that dampens an imaging plate (e.g., silicone) on an imaging member (e.g., drum, cylinder, belt). The fountain solution forms a film on the imaging plate that may be about one (1) micron thick. The imaging member rotates to an "exposure" station where a high power laser imaging module (LIM) removes the fountain solution at the locations of the imaging plate where the image pixels are to be formed. This forms a fountain solution based 'latent image'. The drum then further rotates to a 'development' station where lithographic-like ink may be brought into contact with the fountain solution based 'latent image' and ink 'develops' onto the places where the laser has removed the fountain solution. The drum then rotates to a transfer station where the ink is transferred to a print media such as paper.

A LIM that forms the latent image may include one or more lasers that work with one or more optical components to direct the laser onto the printing plate. Each LIM can utilize a linear output high power infrared (IR) laser to illuminate a digital light projector (DLP) multi-mirror array, also referred to as the "DMD" (Digital Micromirror Device). The laser provides constant illumination to the mirror array. The mirror array deflects individual mirrors to form the pixels on the image plane to pixel-wise evaporate the fountain solution on the silicone plate. If a pixel is not to be turned on, the mirrors for that pixel deflect such that the laser illumination for that pixel does not hit the silicone surface, but goes into a chilled light dump heat sink.

During operation, the LIM optical components can generate a large amount of heat due to the amount of power used by the lasers within the LIM. This heat can negatively affect the optical components. For example, large amounts of heat can cause the optical components of the DMD to operate improperly, operate with a reduced life expectancy, or in extreme instances, cause the optical components to completely fail. During operation, a maximum temperature allowed at the DMD micromirror surface is about 70° C. for reliable operation. When the micromirrors are in the "on state" printing mode, the temperature of the mirrors may increase to over 90° C. When the mirrors are in an "Off-State" more energy is absorbed at the substrate. As a result, the temperature of the micromirrors may increase to temperatures above 130° C., which is at least 50° C. above the 70° C. threshold for reliable operation. Currently used methods may be inefficient in cooling the optical components to a proper temperature range.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing a DMD including a housing, an array of DMD pixels and a heat sink. The housing may have a back wall and side walls ascending from the back wall, with the housing having a front window spatially offset from the back wall and defining an interior therebetween. The array of DMD pixels may be hermetically sealed within the housing, with each pixel having a micromirror configured to tilt independently towards a light source in a projection system and away from the light source. The heat sink may be located between the array of DMD pixels and the back wall of the housing, with both the heat sink and the array in the interior of the housing. The heat sink may include a channel there through, with the channel having an inlet port and an outlet port configured for fluid communication with a coolant source having a coolant, and the channel configured to convey the coolant within the heat sink from the inlet port through the outlet port to actively cool the array of DMD pixels. The coolant source may be external of the housing.

According to aspects described herein, a method of manufacturing a DMD having a housing with the back wall, side walls ascending from the back wall and a front window, and array of DMD pixels hermetically sealed within the housing, and a heat sink between the array of DMD pixels and the back wall of the housing is discussed. The method may include attaching the array of DMD pixels to the heat sink, with the heat sink including channel there through with an inlet port and an outlet port, and the channel configured to convey a coolant within the heat sink from the end the port through the outlet port to actively cool the array of DMD pixels, inserting the array of DMD pixels and heat sink into the housing, with the heat sink adjacent the back wall, placing the front window above the array of DMD pixels opposite the back wall, and hermetically sealing the array of DMD pixels within the housing.

According to aspects illustrated herein, a method for cooling a DMD chip including a housing having a back wall and sidewalls ascending from the back wall, the housing including a front window spatially offset from the back wall and defining and interior therebetween, and array of DMD pixels hermetically sealed within the housing, with each pixel having a micromirror configured to tilt independently towards a light source in a projection system and away from the light source, and a heat sink between the array of DMD pixels and the back wall of the housing with both the heat sink and the array in the interior of the housing, the heat sink including a channel there through, the channel having an inlet port and an outlet port configured for fluid communication with a coolant source having a coolant, the channel configured to convey the coolant within the heat sink from the end that port through the outlet port to actively cool the array of DMD pixels is discussed. The method may include measuring a temperature of the DMD chip with a temperature sensor, determining that the temperature of the DMD chip is above a threshold, and providing a coolant into and through the DMD chip.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Figure 1:
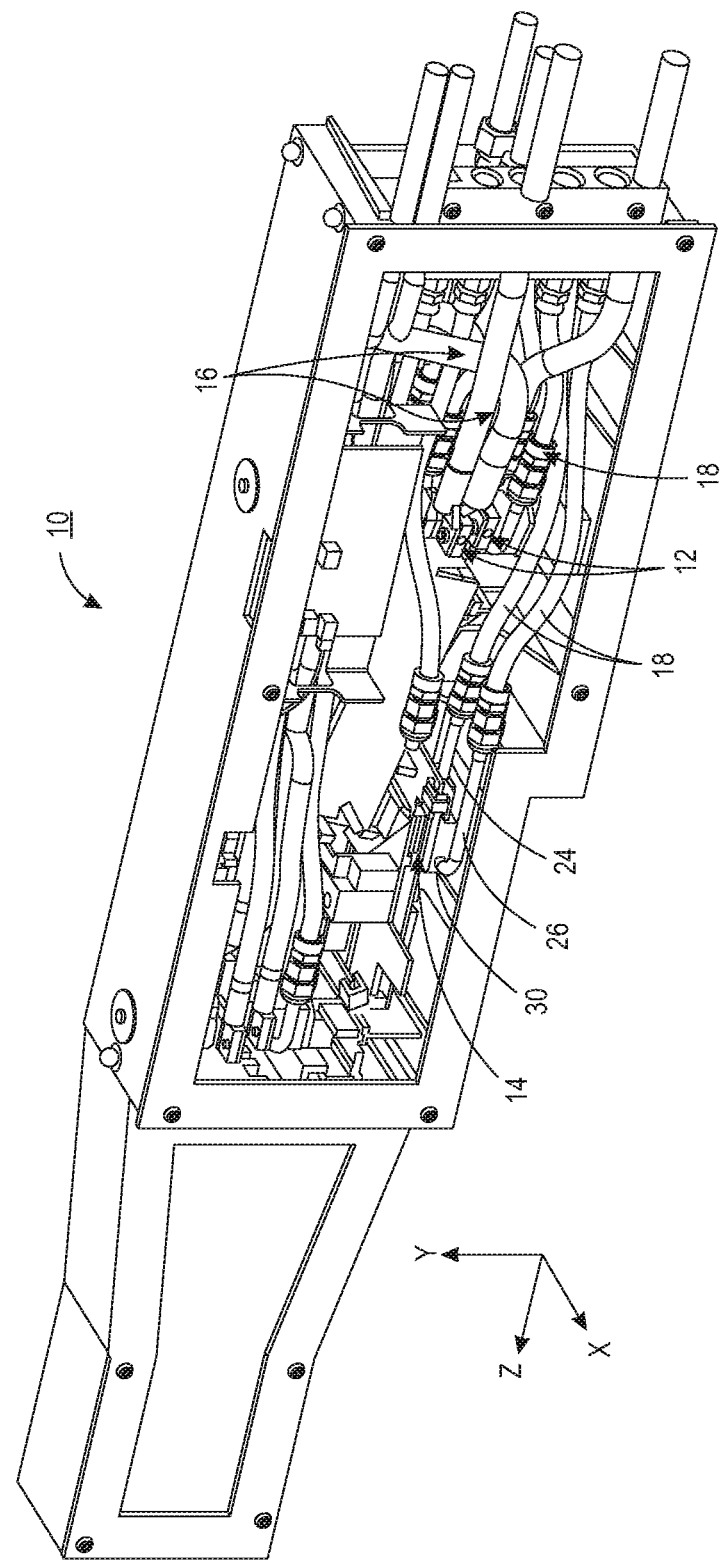
FIG. 1 is a perspective view of an exemplary laser imaging module (LIM) of the present disclosure within a laser imaging module.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The terms "print media", "print substrate", "print sheet" and "sheet" generally refers to a usually flexible physical sheet of paper, polymer, Mylar material, plastic, or other suitable physical print media substrate, sheets, webs, etc., for images, whether precut or web fed.

The term "printer", "imaging device" or "imaging machine" as used herein refers to a digital copier or printer, scanner, image printing machine, xerographic device, electrostatographic device, digital production press, document processing system, image reproduction machine, bookmaking machine, facsimile machine, multi-function machine, or generally an apparatus useful in performing a print process or the like and can include several marking engines, feed mechanism, scanning assembly as well as other print media processing units, such as paper feeders, finishers, and the like. A "printer" may handle sheets, webs, substrates, and the like. A printer can place marks on any surface, and the like, and is any machine that reads marks on input sheets; or any combination of such machines.

The present disclosure broadly discloses an apparatus and method for cooling a digital micromirror device (DMD), also referred to herein as a DMD chip. As discussed above, some printers or imaging machines use a laser imaging module (LIM), which may include one or more lasers that work with one or more optical components to redirect the laser to a print medium to print an image. During operation, the optical components can generate a large amount of heat due to the amount of power used by the lasers within the LIM. Such heat can negatively affect the operation and life expectancy of the optical components. A DMD presents further challenges to properly cool the DMD due to high heat fluxes involved. Due to how the DMD is typically mounted on a circuit board, the amount of space available for effective cooling is very limited. Also, the DMD components mainly have a low thermal conductivity, which impedes the removal of heat. For example, the heat flux at the surface plane of the mirrors varies with location, reaching a maximum of about 44.5 W/cm$^2$, and the amount of energy absorbed at substrates below the mirrors of the same order of magnitude at about 46.9 W/cm$^2$. Embodiments of the present disclosure provide a novel apparatus and method that provides a higher heat transfer rate than previous designs.

One embodiment of the present disclosure provides a cooling system integrated within a DMD chip. The DMD chip includes a micromirror array that may be mounted on a very thin silicon wafer (e.g., about 0.1 to 0.2 mm thick). The silicon wafer and the micromirror array may be mounted on a fluid cooled heat sink with a single pass cooling channel. The term "heat sink" generally refers to a passive heat exchanger that transfers heat generated by an electronic or a mechanical device, such as the optical components in the DMD chip, to a fluid medium where it is dissipated away from the device, thereby allowing regulation of the device's temperature at optimal levels. In examples of embodiments, the fluid coolant may be pumped through the channel to remove the energy from the silicon substrate and the micromirror array. The coolant can be a non-conductive fluid, for example a mixture of water and ethylene-glycol mixture (e.g., at about 85/15% concentration ratio). Other coolants can be used such as FC-72 and FC-78. The coolant may also be a one-phase refrigerant or a two-phase refrigerant.

In one embodiment a DMD may include a housing, an array of DMD pixels and a heat sink, with the heat sink at least part of the cooling system. The housing may have a back wall and side walls ascending from the back wall, with the housing having a front window spatially offset from the back wall and defining an interior therebetween. The array of DMD pixels may be hermetically sealed within the housing, with each pixel having a micromirror configured to tilt independently towards a light source in a projection system and away from the light source. The array may be a rectangular array of thousands of microscopic mirrors which correspond to pixels in an image to be displayed. The heat sink may be located between the array of DMD pixels and the back wall of the housing, with both the heat sink and the array in the interior of the housing. The heat sink may include a channel there through, with the channel having an inlet port and an outlet port configured for fluid communication with a coolant source having a coolant, and the channel configured to convey the coolant within the heat sink from the inlet port through the outlet port to actively cool the array of DMD pixels. The coolant source may be external of the housing.

In an embodiment, the DMD may include an inlet conduit as part of the cooling system between the inlet port and the coolant source, with the inlet conduit extending through the housing to provide fluid communication from the coolant source to the heat sink channel. The DMD may include an outlet conduit as part of the cooling system between the outlet port and the coolant source, with the outlet conduit extending through the housing to provide fluid communication from the heat sink channel to the coolant source. At least one of the inlet conduit and the outlet conduit may extend through the back wall of the housing. At least one of the inlet conduit and the outlet conduit may extend through at least one of the sidewalls of the housing.

In an embodiment, the DMD may include an epoxy border between the sidewalls of the housing and the front window of the housing, with the epoxy border configured to hermetically bond the front window to the sidewalls. In an embodiment, the DMD may include a bezel between the sidewalls of the housing and the array of DMD pixels, with the bezel configured cured to hold the array of DMD pixels in lateral position within the housing.

In an embodiment, a substrate may be attached to the array of DMD pixels that extends from the array along the plane of the array. The substrate may be a silicone substrate. The array of DMD pixels may be fixed to the heat sink via a chemical bond between the substrate and the heat sink.

The coolant may be any type of fluid that transfers heat away from the DMD. One example of a coolant that may be used is a mixture of water and ethylene glycol. Another example of a coolant that may be used is a fluorocarbon-based fluid. Examples of such fluorocarbon-based fluids are perflurohexane and perfluoro (2-butyl-tetrahydrofurane), which are known by the tradename of Fluorinert®.

FIG. 1 illustrates an exemplary laser imaging module (LIM) or apparatus 10 of the present disclosure. In one embodiment, the LIM 10 may be part of an imaging device or printer. In one embodiment, the LIM 10 may include one or more laser diodes 12 as an exemplary light source that emit lasers that are redirected by a DMD 14 onto a print medium (e.g., paper, plastic, fabric, and the like). The laser diodes 12 may be connected to a processor, a power source, and the like via one or more electrical connections 16. No particular limitation to a specific configuration of the laser imaging module is to be construed based on the description of the exemplary elements depicted and described herein.

In one embodiment, the laser diodes 12 may be powered by a large amount of power. For example, the laser diodes 12 may be powered by as much as 360 Watts of energy and can generate large amounts of heat. In one embodiment, the laser diodes 12 may be cooled by one or more coolant lines 18.

In one embodiment, the DMD 14 may include a DMD array of small mirrors 20 that are used to redirect the laser, or light, emitted by the laser diodes 12. During operation the large amount of energy of the light emitted by the laser diodes 12 can cause the DMD 14 to rise in temperature. High temperatures can cause damage to the DMD 14 or complete failure. For example, temperatures above 70 degrees Celsius (° C.) can decrease the life of the DMD 14. Temperatures above 120° C. can cause damage or failure to the DMD 14.

Figure 2:
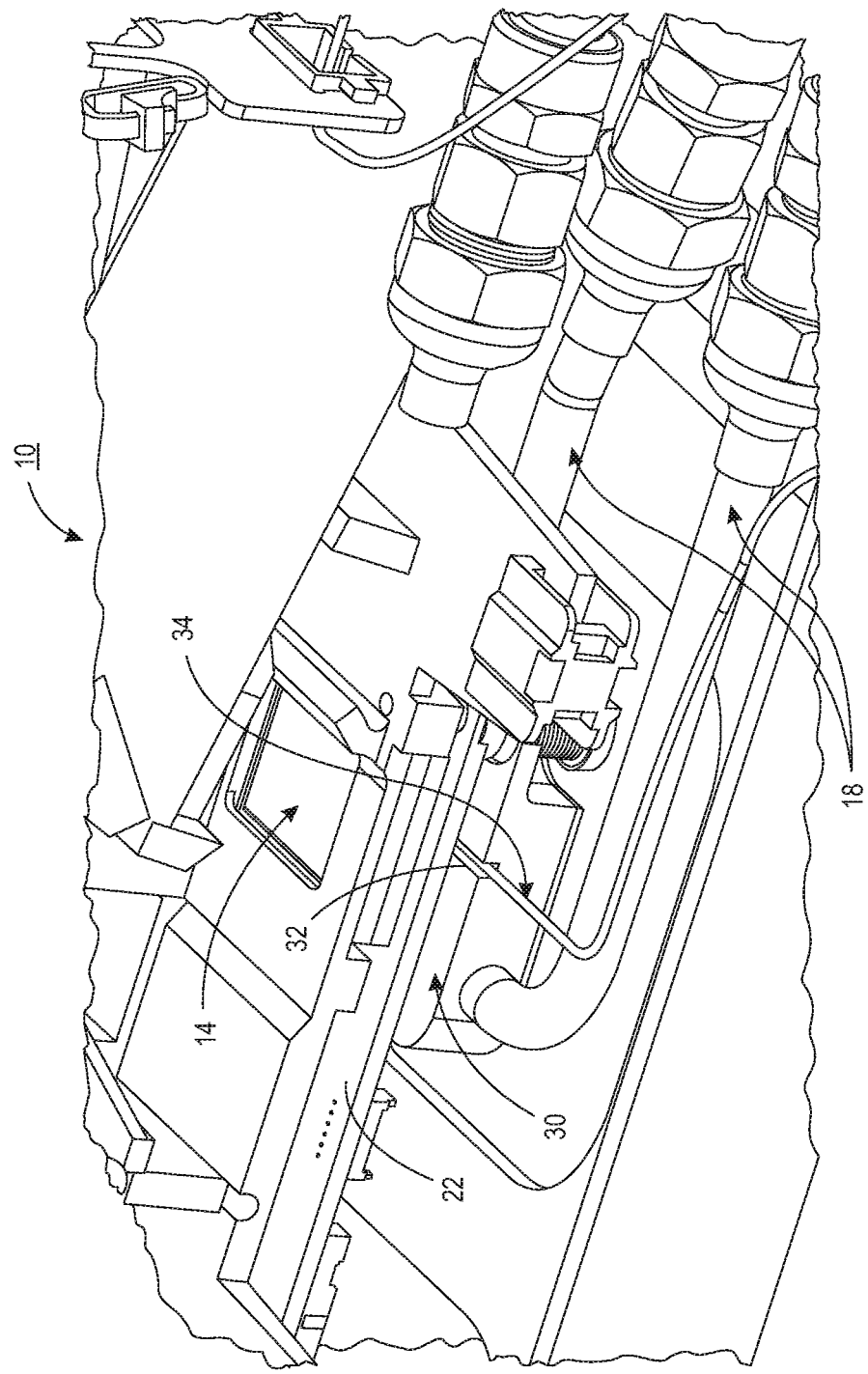
FIG. 2 is a more detailed view of the LIM 10 shown in FIG. 1.

FIG. 2 illustrates a more detailed view of the LIM 10 shown in FIG. 1. Some components from FIG. 1 have been removed in FIG. 2 to show by example in greater detail by how the DMD 14 is positioned on an electrical or circuit board 22 and on a coolant conduit manifold 30 below the circuit board (e.g., PCB 205). The movement of the mirrors in the DMD mirror array 20 are generally controlled electronically with a computer and/or circuitry provided on a circuit board. The DMD 14 may thus be mounted on the board 22. In one embodiment, the coolant conduit manifold 30 may include a cut-out or groove 32 that holds a heat sensing device or temperature sensor 34.

In an embodiment, the temperature sensor 34 may be coupled, directly or indirectly, to the coolant conduit manifold 30 and/or the DMD 14. The temperature sensor 34 may be a thermistor wire, a thermocouple, or any other type of temperature sensing device. The sensor 34 may measure the temperature of the DMD 14. Based on the temperature, a processor or controller, may release, or move, coolant through the coolant lines 18 and the coolant conduit manifold 30. For example, when the temperature measured by the temperature sensor 34 rises above a temperature threshold (e.g., about 20° C. to 30° C.), the coolant may be moved through the DMD 14 to lower, and maintain, the temperature back below the threshold temperature. In another example, the sensor 34 may send feedback to the processor or controller such that the processor could send a command to a chiller or coolant source within a cooling system (FIG. 3) and change the coolant temperature.

Figure 3:
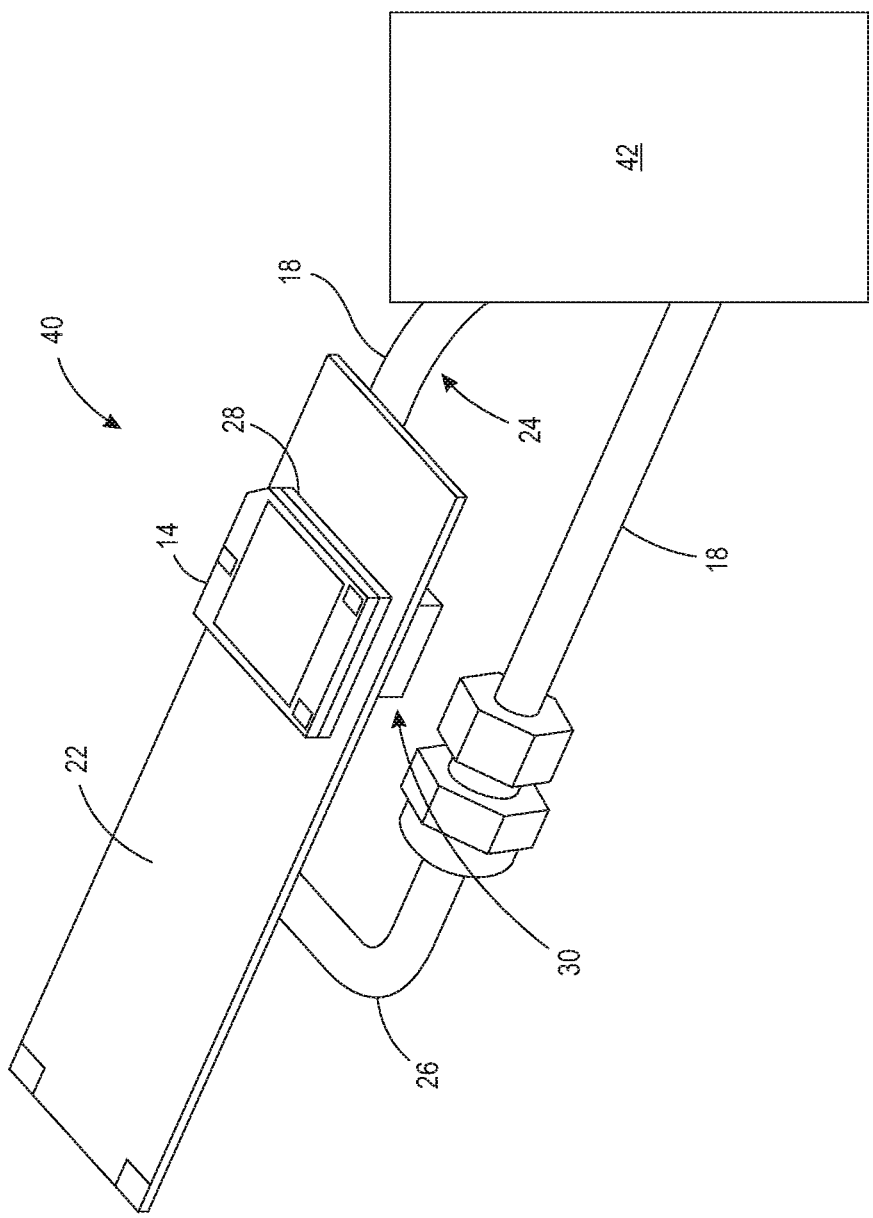
FIG. 3 is a block diagram of an exemplary cooling system.

FIG. 3 illustrates a block diagram of an exemplary cooling system 40 associated with the DMD chip 14, with the DMD mounted on the board 22 via a plug or DMD socket 28. The DMD socket 28 may be made of a material having a low thermal conductivity, such as a plastic (e.g., $k_{plastic}$=0.63 W/m-K). The coolant conduit manifold 30 can be disposed below the board 22. The manifold 30 is serviced with cooling fluid via a coolant circulation system 42 that provides coolant to the manifold 30 and DMD chip 14 via a coolant inlet line 24 and a coolant outlet line 26 of the coolant lines 18. In an embodiment, the coolant circulation system 42 is configured to pump the cooling fluid through the cooling block with a velocity of, for example, 3.6 m/s.

Figure 4:
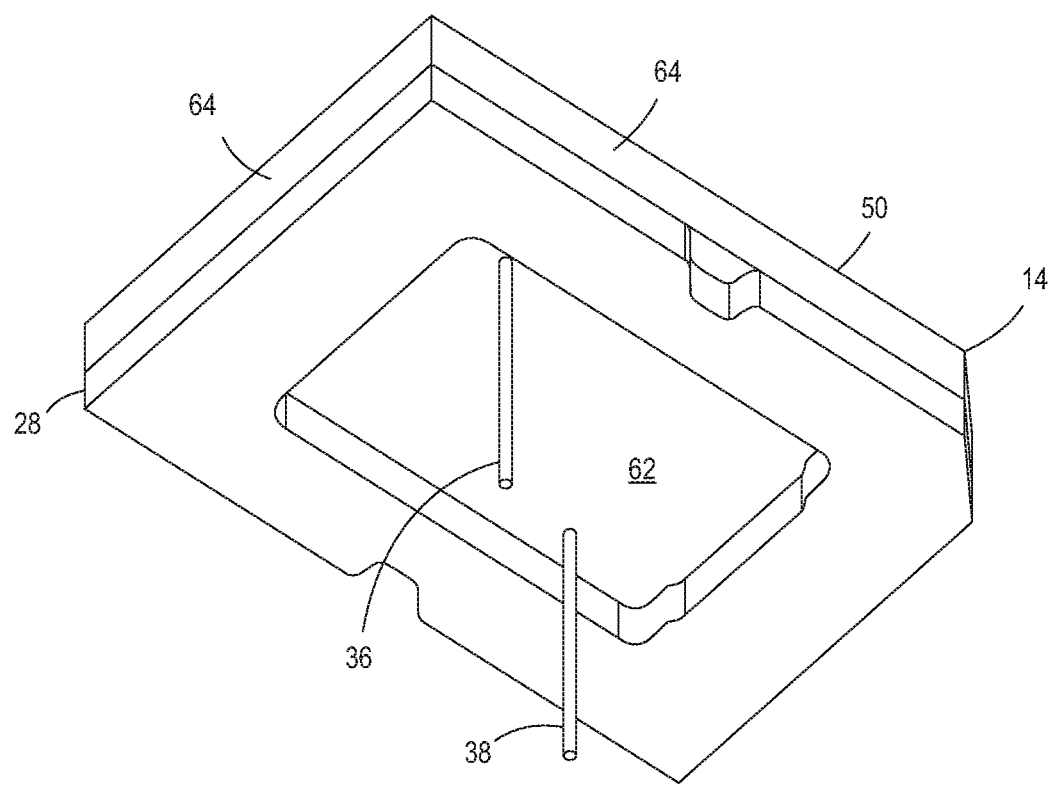
FIG. 4 is a perspective view depicting an underside of an exemplary DMD.

FIGS. 4-7 depict the DMD 14 with an exemplary cooling mechanism 44 in accordance with an embodiment. Referring to FIG. 4, an underside of the DMD 14 is shown attached to the socket 28, which may be mounted on the circuit board 22. The cooling mechanism 44 may include an inlet conduit 36 and an outlet conduit 38 that extend into the DMD 14 and are configured to provide fluid communication through the DMD as described in greater detail below. The cooling mechanism 44 may also include a heat sink within the DMD in fluid communication with the inlet and outlet conduits 36, 38.

Figure 5:
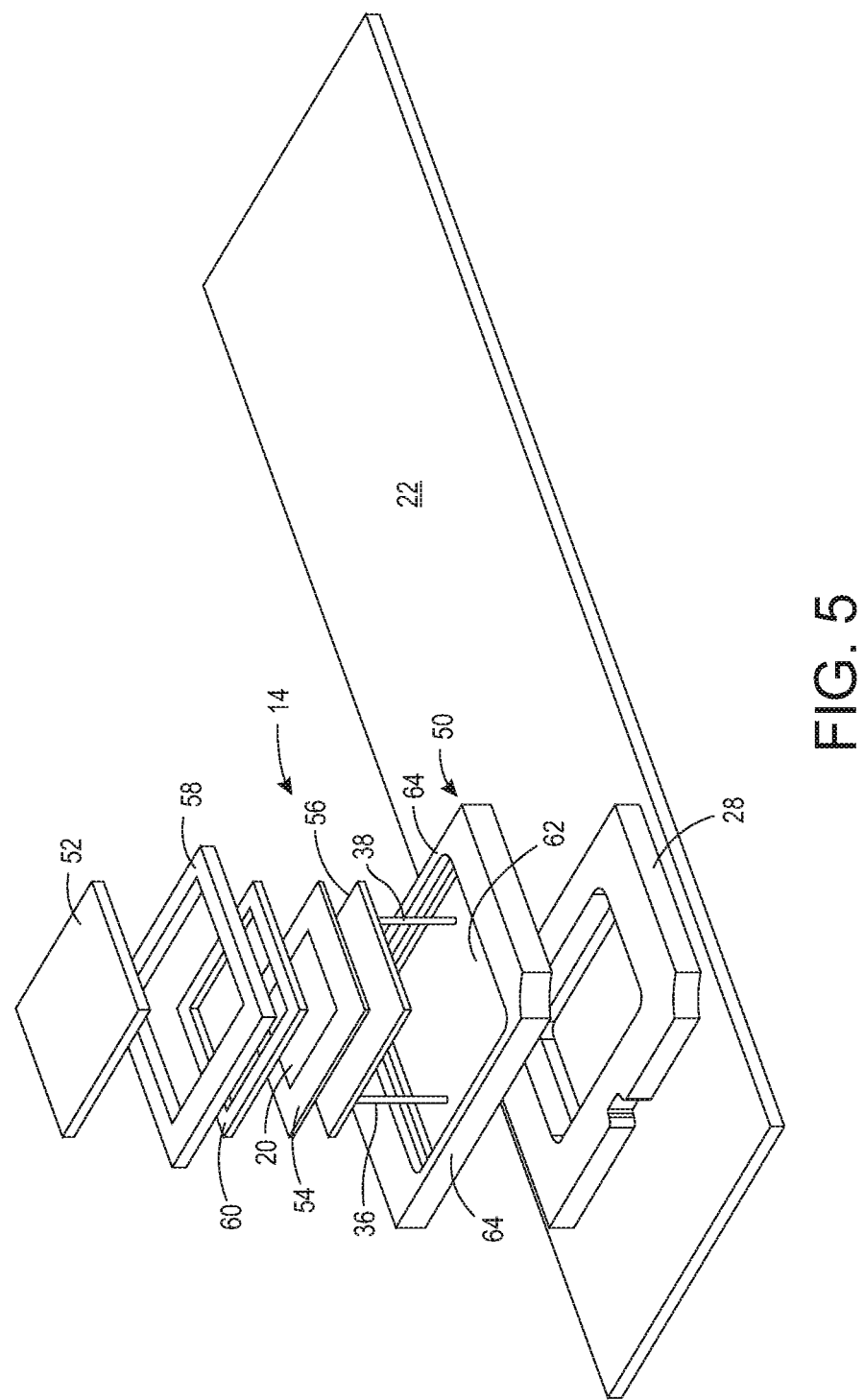
FIG. 5 illustrates a DMD assembly in exploded view.
Figure 6:
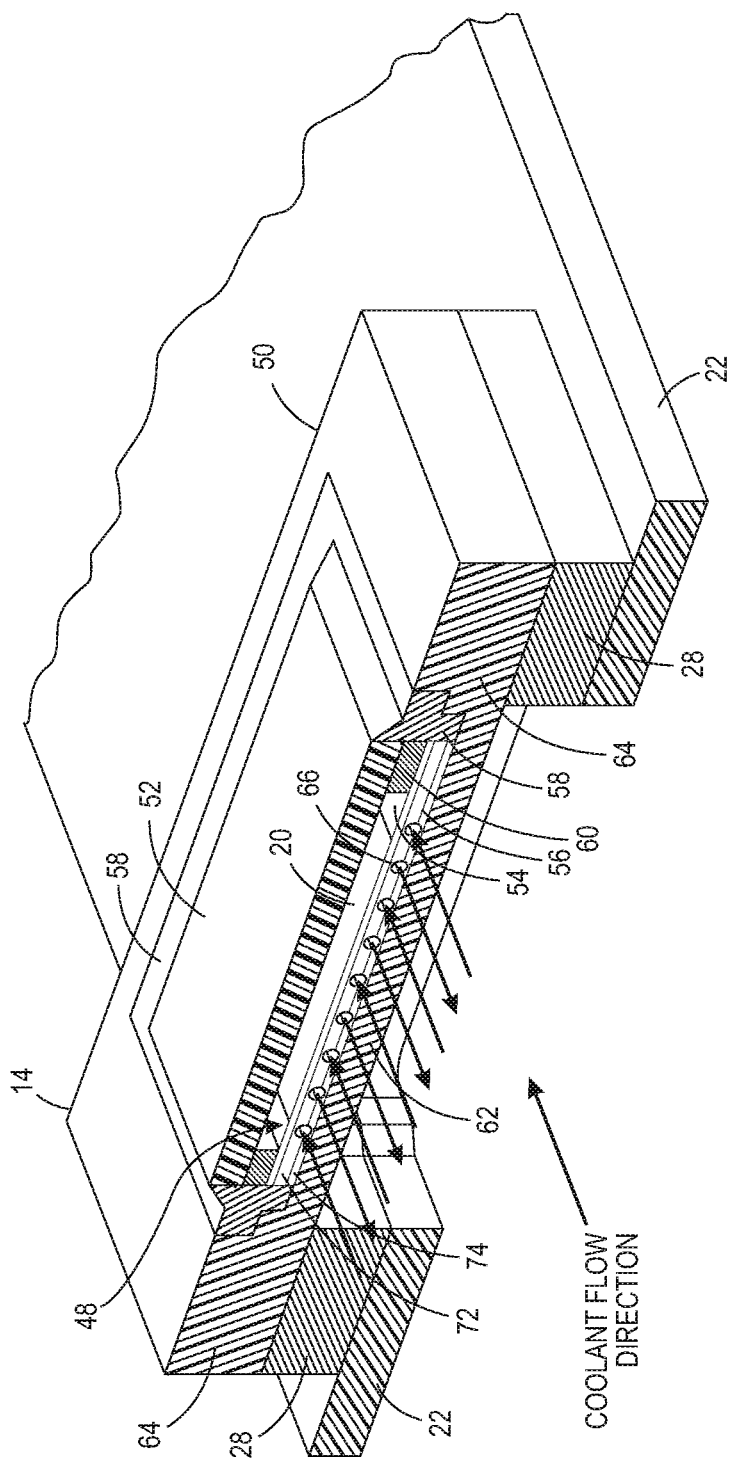
FIG. 6 illustrates the DMD assembly of FIG. 5 in cross-sectional view.

FIG. 5 illustrates a DMD assembly 46 in exploded view and FIG. 6 shows the DMD assembly in cross-sectional view, with both views including the socket 28, the circuit board 22, and the DMD 14. The DMD 14 includes a housing 50 with a separate front window 52, an array of DMD pixels 20 attached to a substrate (e.g., silicon substrate 54), a heat sink 56, and sealing members for hermetically sealing the array of DMD pixels within the housing. The sealing members may include an epoxy border 58 shown above a support bezel 60 in the exploded view of FIG. 5 and surrounding the bezel when installed (FIG. 6). The front window 52 of the housing 50 is located above the array of DMD pixels 20 and can be configured from glass having a thermal conductivity of, for example, $k_{glass}$=1.2 W/m-K. The glass may be a high quality optical glass and a coating may be applied to the glass to improve the optical properties of the window.

Referring to FIG. 6, the housing 50 may have a back wall 62 and side walls 64 (FIG. 6) ascending upwards from the back wall. While not being limited to a particular material, the housing may be formed of an alumina. The housing may have a higher thermal conductivity (e.g., $k_{alumina}$=30 W/m-K) than the socket 28. However, the housing's material or thermal conductivity are not limited thereto. The array of DMD pixels 20 may have micro mirrors as the pixels configured to tilt independently towards and away from a light source (e.g., diodes 12). The array 20 is supported by the bordering substrate 54 that can be configured from silicone and may have a thermal conductivity of, for example, $k_{silicon}$=149.0 W/m-K. The epoxy border 58, which can be configured from an epoxy or like material having a thermal conductivity of, for example, $k_{epoxy}$=0.854 W/m-K, may seal the front window 52 to the side walls 64. The support bezel 60 can be configured from glass or like material and may have a thermal conductivity of, for example, $k_{glass}$=1.2 W/m-K. The bezel 60 may be positioned between the bordering substrate 54 and the front window 52, and may maintain a spatial gap 48 between the mirrors of the DMD pixel array 20 and the front window. The gap 48 may be filled with nitrogen having an example thermal conductivity of 0.0289 W/m-K.

As can be seen by example in FIG. 6, the DMD pixel array 20, substrate 54 and heat sink 56 may be set in the interior of the housing, for example, with the heat sink 56 between the DMD pixel array and the back wall 62 of the housing. In this manner, the heat sink is inside of the housing 50 and between the side walls 64. Accordingly the heat sink is within and part of the DMD chip 10. The housing 50 with the front window 52, the heat sink 56 and the sealing members may hermetically seal the DMD pixel array 20 within the housing. Further, even though a coolant fluid, which may be a liquid, flows through the heat sink 56 which may be inside the housing, the DMD pixel array 20 may remain hermetically sealed from the coolant during operation. Accordingly, the array of DMD pixels may remain sealed from coolant access or flow, as the coolant flows within the heat sink 56 as described by example in greater detail below.

Figure 7:
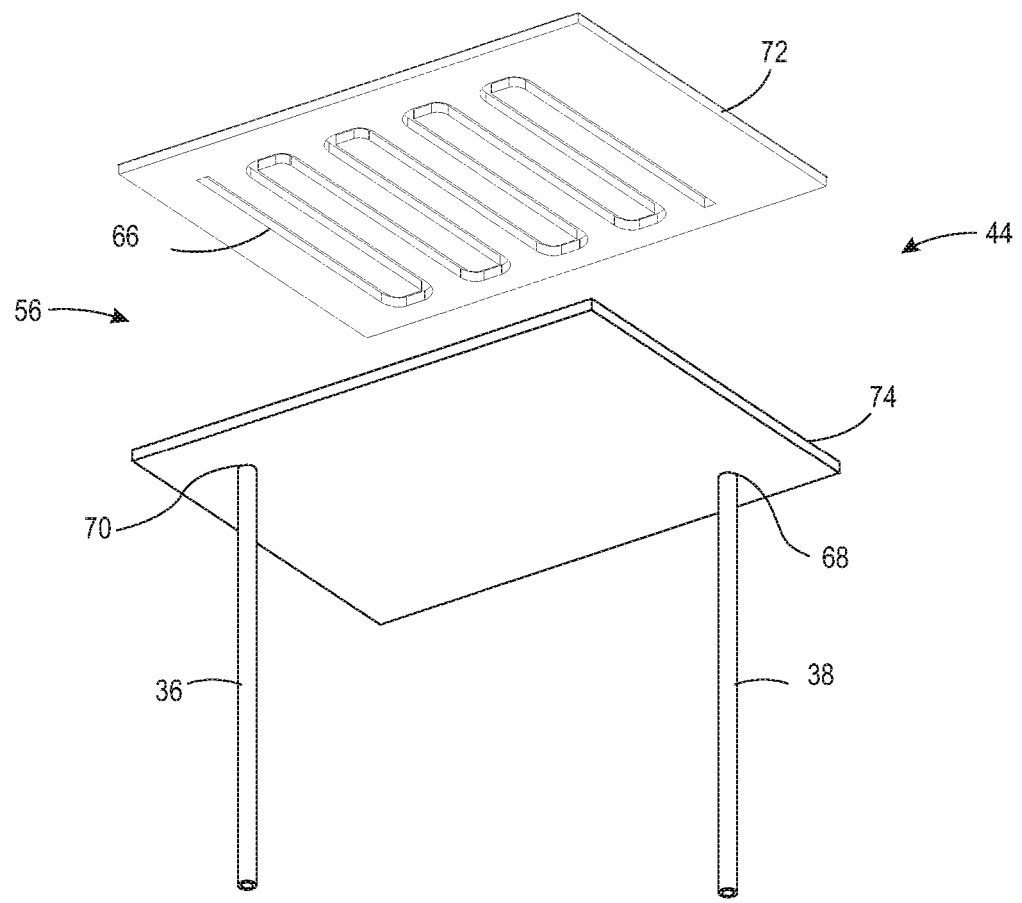
FIG. 7 is an exploded view of an exemplary cooling mechanism in accordance with embodiments.

The heat sink 56 is positioned between the array of DMD pixels 20 and the back wall 62 of the housing 50. Referring to FIG. 7, the heat sink 56 includes a channel 66 within the heat sink, with the channel having an inlet port 68 and an outlet port 70 at opposite openings of the channel. The heat sink 56 may include an upper section 72 and a lower section 74. At least one of the sections 72, 74 may have the channel 66, which may be etched into the appropriate section. Both sections 72 and 74 may have at least a portion of the channel 66, and the sections may be bonded together with the portions of the channel aligned to result in the channel continuous and spanning nearly the length and width of the heat sink for fluid flow from the inlet port 68 to the outlet port 70. A gasket can be implemented between the upper and lower sections to ensure that the heat sink 56 is leak-proof.

The channel 66 may have a serpentine shape between the inlet and outlet ports to increase the area of the heat sink that may be cooled by the coolant and increase the surface area of the heat sink adjacent the array of DMD pixels 20 to transfer heat from the array to the heat sink and out with the coolant exiting the outlet port 70. The channel 66 is not limited to a serpentine shape, and may have any shape that allows coolant flow through the heat sink 56. Further, while FIG. 7 illustrates the inlet port 68 and outlet port 70 extending through the lower section, this is by example and not limited thereto as other configurations are available, as discussed by example below.

The inlet and outlet ports are configured for fluid communication with coolant. In particular, the inlet conduit 36 may be attached to the heat sink 56 at inlet port 68 so that the coolant fluid may flow within the inlet conduit 36 through the inlet port 68 and into the channel 66. Further, the outlet conduit 38 may be attached to the heat sink 56 at the outlet port 70 so that the coolant fluid flowing through the channel 66 may flow through the output port 70 and then through the outlet conduit out of the DMD 14. The heat sink 56 may be formed from a metal, such as copper, and may have a high thermal conductivity of, for example, $k_{copper}$=385.0 W/m-K, for transferring heat from the adjacent DMD pixel array 20 and silicone substrate 54 to the coolant flowing within the channel 66. The material of the heat sink is not limited to a particular material, and may alternatively be formed of other similar conducting materials similar to copper.

Cooling fluid may be pumped into the coolant inlet line 24, manifold 30 and inlet conduit 36 via the cooling circulation system 42 and introduced to the heat sink 56. The heat sink 56 is specifically configured with the channel 66 there through as illustrated, for example, in FIG. 7. The heat sink 56 can be in the DMD chip 14 under the array of DMD pixels 20. As the incident energy from the LIM 10 increases the temperature of the DMD 14, the heat is conducted away from the array of DMD pixels 20 and other DMD components through the heat sink 56 and out of the DMD with the coolant exiting the DMD via the outlet conduit 38. The heat is thus transferred to the coolant fluid via the heat sink 56 and then expelled as the coolant exits the DMD 14.

Figure 8:
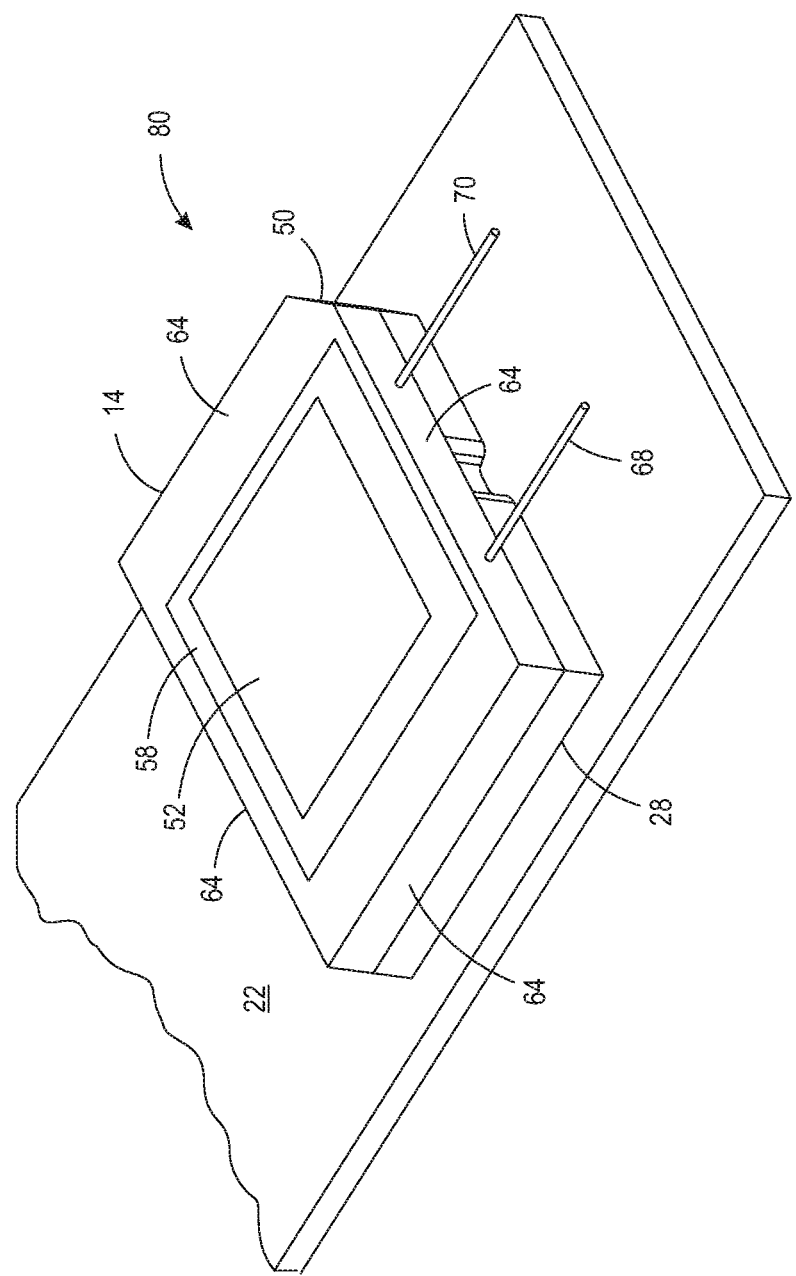
FIG. 8 is a perspective view depicting another exemplary DMD in accordance with embodiments.
Figure 9:
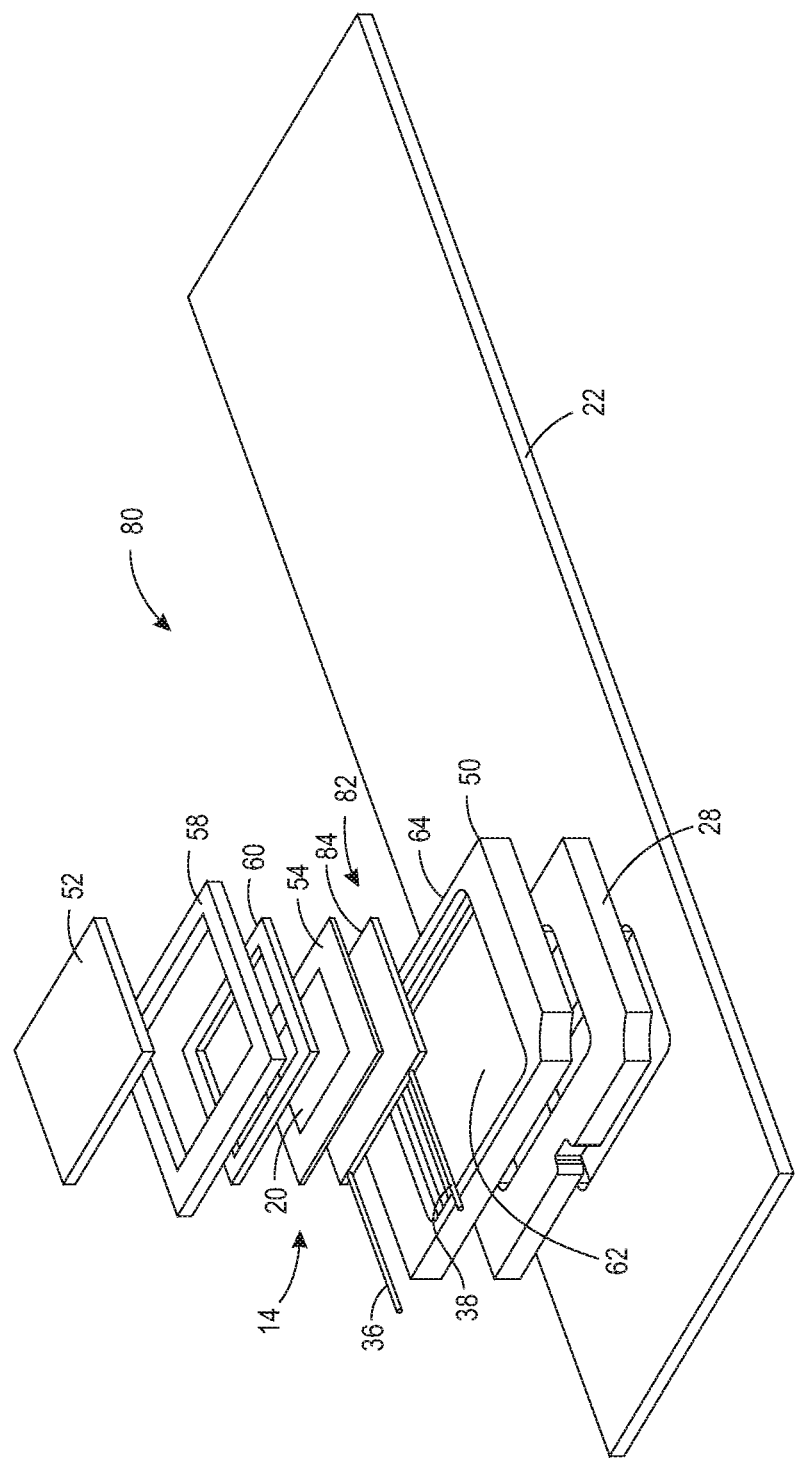
FIG. 9 is an exploded view of the DMD illustrated in FIG. 8.

FIGS. 8-11 depict another example of the DMD 14 with FIG. 8 showing a DMD assembly 80 in perspective view and FIG. 9 an exploded view of the DMD assembly. As can be seen by example in FIGS. 8 and 9, the DMD pixel array 20, substrate 54 and a heat sink 84 may be set in the interior of the housing 50, for example, with the heat sink between the DMD pixel array and the back wall 62 of the housing. In this manner, the heat sink 84 is inside of the housing 50 and between the side walls 64. Accordingly the heat sink 84 is within and part of the DMD chip 14. The housing 50 with the front window 52, the heat sink 84 and the sealing members may hermetically seal the DMD pixel array 20 within the housing. Further, even though a coolant fluid may flow through the heat sink 84 inside the housing 50, the DMD pixel array 20 may remain hermetically sealed from the coolant. Accordingly, the array of DMD pixels 20 may remain sealed from coolant access or flow, as the coolant flows within a cooling mechanism 82 as described by example in greater detail below.

In this example, the cooling mechanism 82 is substantially similar to the cooling mechanism 44, and is shown in a different configuration with an alternate channel, inlet port, outlet port and conduit access thereto. The cooling mechanism 82 may include the inlet conduit 36 and the outlet conduit 38 that extend into the DMD 14 and are configured to provide fluid communication through the DMD. The cooling mechanism 82 may also include the heat sink 84 substantially similar to the heat sink 56, and within the DMD 14 in fluid communication with the inlet and outlet conduits 36, 38. For example, the heat sink 84 may be formed from a metal, such as copper, and may have a high thermal conductivity of, for example, $k_{copper}$=385.0 W/m-K, for transferring heat from the adjacent DMD pixel array 20 and silicone substrate 54 to the coolant flowing within the channel 66.

Figure 10:
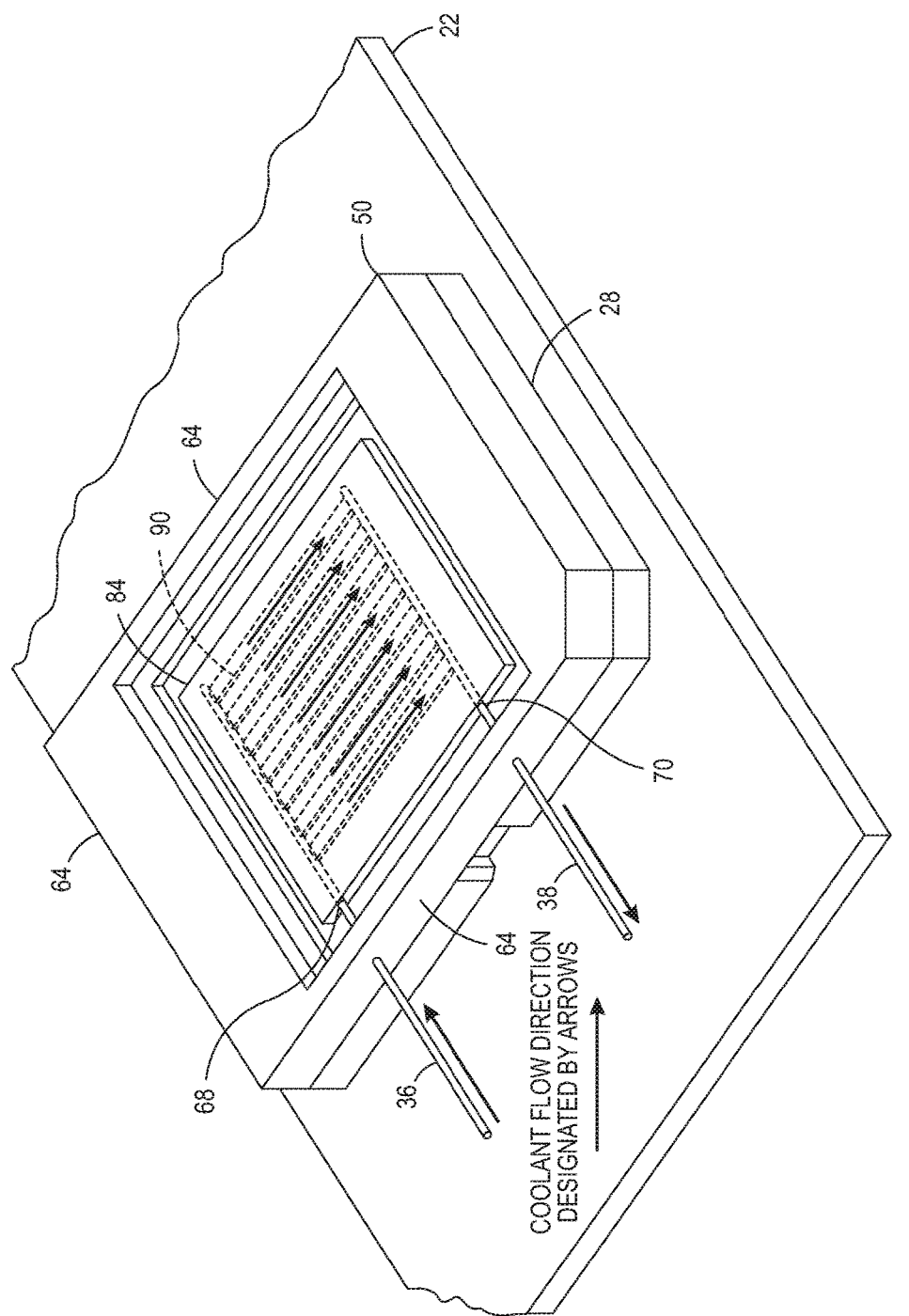
FIG. 10 is a perspective view of an exemplary cooling mechanism integrated within the DMD illustrated in FIG. 8.
Figure 11:
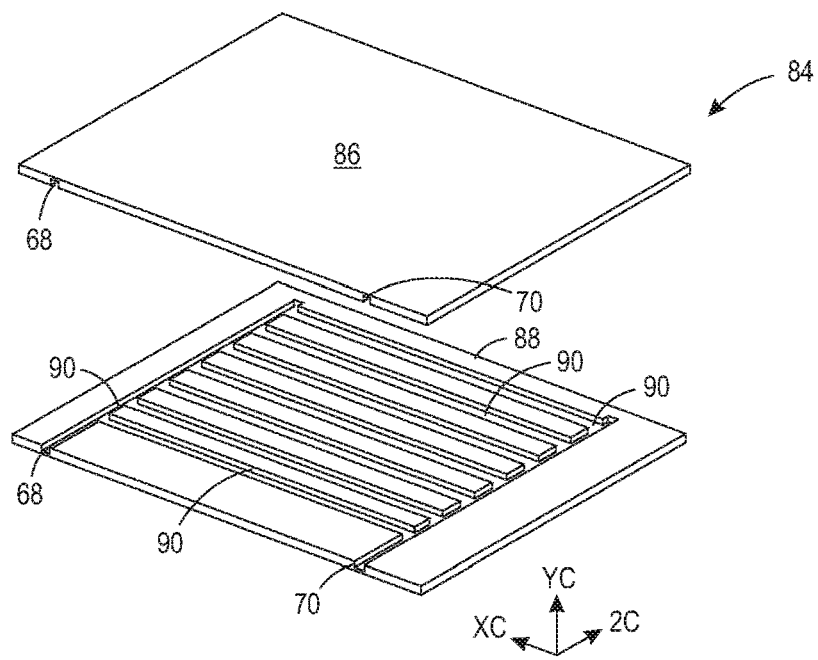
FIG. 11 is an exploded view of a heat sink shown in FIG. 9.

Referring to FIGS. 10 and 11, the heat sink 84 includes a channel 66 that spans nearly the length and width of the heat sink, with the channel having an inlet port 68 and an outlet port 70 at opposite openings of the channel for fluid communication with a coolant. The heat sink 84 may include an upper section 86 and a lower section 88. At least one of the sections 86, 88 may have the channel 66, which may be etched into the appropriate section. Both sections may have at least a portion of the channel 66, and the sections may be bonded (e.g., brazed) together with the portions of the channel aligned to result in the channel continuous for fluid flow from the inlet port 68 to the outlet port 70. The channel can be machined using a micromachining process as readily understood by a skilled artisan.

A gasket can be implemented between the upper and lower sections to ensure that the heat sink 84 is leak-proof. The cross sectional dimension and shape of the channel 66 to maximize the heat transfer rate. An example of the shape and dimension of the channel can be seen in FIG. 11, with the channel having lines 90 in parallel within the heat sink 84 to maximize the area of the heat sink that may be cooled by the coolant and the surface area of the heat sink adjacent the array of DMD pixels 20 to transfer heat from the array to the heat sink and out with the coolant exiting the outlet port 70. In the example the inlet port 68 and outlet port 70 are shown as extending out of a side of the heat sink (FIG. 10), where they may be attached to the inlet and outlet conduits 36, 38, respectively. From there, the inlet and outlet conduits 36, 38 may extend through any one of the DMD side walls 64 and connect to the coolant inlet line 24 and coolant outlet line 26, respectively for fluid communication with the coolant circulation system 42.

Cooling fluid may be pumped into the coolant inlet line 24, manifold 30 and inlet conduit 36 via the coolant circulation system 42 and introduced to the heat sink 84. The heat sink 84 may be in the DMD chip 14 between the array of DMD pixels 20 and the back wall 62. As the incident energy from the LIM 10 increases the temperature of the DMD 14, the heat is conducted away from the array of DMD pixels 20 and other DMD components through the heat sink 84 and out of the DMD with the coolant exiting the DMD via the outlet conduit 36. The heat is thus transferred to the coolant fluid via the heat sink 84 and then expelled as the coolant exits the DMD 14.

Figure 12:
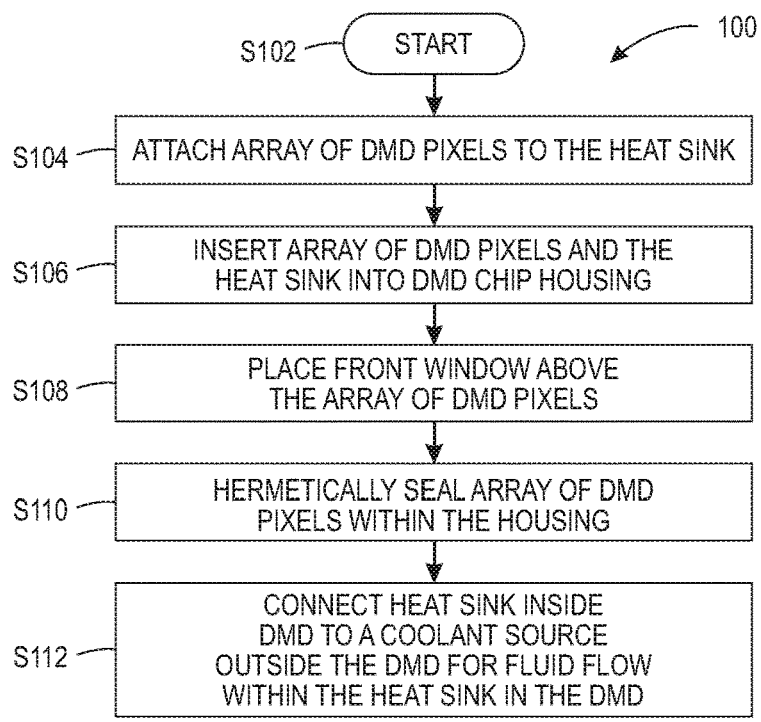
FIG. 12 is a flowchart of an exemplary method for making a DMD in accordance with embodiments.

FIG. 12 illustrates a flowchart of an example method 100 for manufacturing a digital micromirror device (DMD) having a housing with the back wall, sidewalls ascending from the back wall and a front window, and array of DMD pixels hermetically sealed within the housing, and a heat sink between the array of DMD pixels and the back wall of the housing.

At step S102, the method 100 begins. At step S104, the array of DMD pixels is attached to the heat sink. The array of DMD pixels may be chemically bonded to the heat sink, for example, by soldering a silicon substrate attached to the array about a plane of periphery thereof to the heat sink. The heat sink may include a channel there through with an inlet port and an outlet port. The channel may convey a coolant within the heat sink from the inlet port through the outlet port to actively cool the array of DMD pixels by transferring heat from within the DMD to the coolant, which then flows out of the DMD chip.

At step S106, the array of DMD pixels and the heat sink are inserted into the housing, with the heat sink adjacent the back wall. In this manner, the heat sink is set within the housing between the sidewalls thereof. The method proceeds to step S108, where the front window of the housing is placed above the array of DMD pixels. In an example, a bezel may be placed between the front window and the silicon substrate to maintain a spatial gap between the array of DMD pixels and the front window.

The method proceeds to step S110, where the array of DMD pixels is hermetically sealed within the housing. This step may include fixing and epoxy border between the sidewalls of the housing and the front window of the housing, with the epoxy border hermetically bonding the front window to the sidewalls. Proceeding to step S112, the heat sink is connected to a coolant source outside of the DMD for fluid flow within the heat sink in the DMD. For example, the inlet port of the heat sink may be coupled to the coolant source via an inlet conduit extending through the housing, and the output port of the heat sink may be coupled to the coolant source via an outlet conduit extending through the housing, with the coolant source providing the coolant to the channel within the DMD. The coolant source may be a coolant circulation system as readily understood by a skilled artisan.

Figure 13:
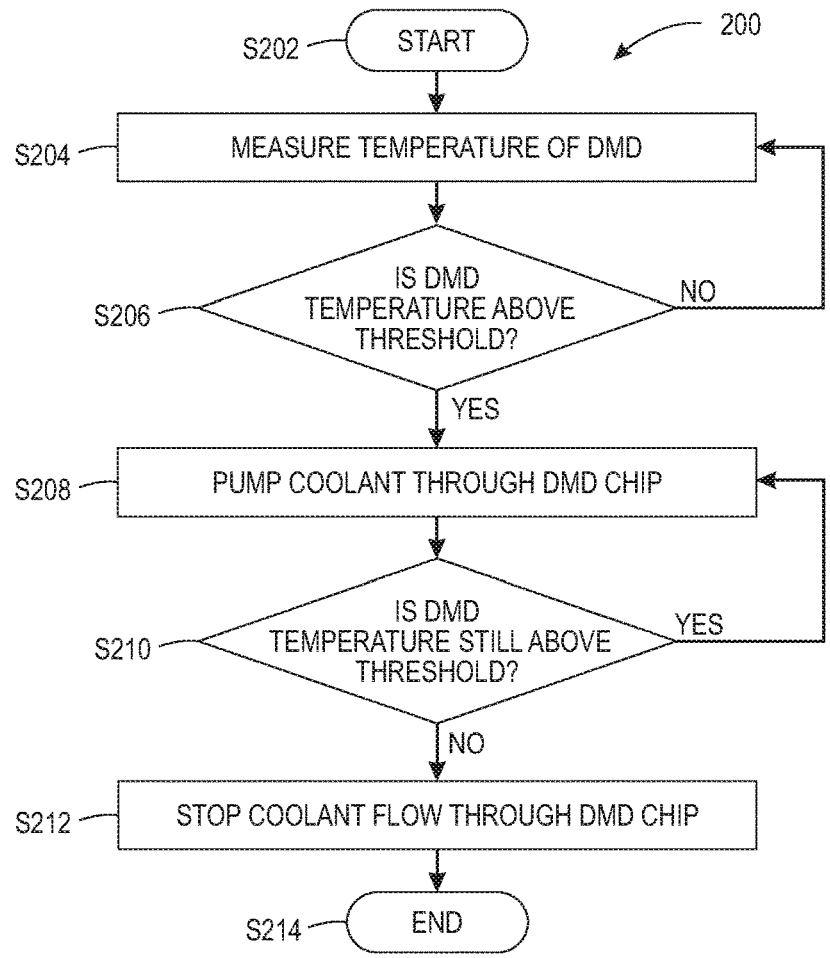
FIG. 13 is a flowchart of an exemplary method for cooling a DMD in accordance with embodiments.

FIG. 13 illustrates a flowchart of an example method 200 for cooling a DMD chip, with the chip including a housing having a back wall and side walls ascending from the back wall. In one embodiment, one or more steps or operations of the method 200 may be performed by the LIM 10 or a computer that controls the LIM 10 as illustrated in FIG. 13 and discussed below. The housing may include a front window spatially offset from the back wall and defining an interior there between. The DMD chip also includes an array of DMD pixels hermetically sealed within the housing, with each pixel having a micromirror that may tilt independently towards a light source in a projection system and away from the light source. The DMD may also include a heat sink between the array of DMD pixels and the back wall of the housing with both the heat sink and the array within the interior of the housing. The heat sink may include a channel there through, with the channel having an inlet port and an outlet port for fluid communication with a coolant. The channel may convey the coolant within the heat sink in the DMD, from the inlet port through the output port to actively cool components within the DMD.

At step S202, the method 200 begins. At step S204, the method 200 measures a temperature of the DMD. For example, a temperature sensor may measure the temperature of the DMD. Processing continues to step S206, where the method 200 determines if the temperature of the DMD is above a threshold. For example, the threshold may be a temperature that is associated with degradation of life or failure of the DMD. In one embodiment, the threshold may be 20° C. to 30° C. For the DMD assemblies 46, 80, this temperature range may correspond to a coolant temperature of about 16° C. The temperature at the bottom surface of the exemplary DMD housing may approach about 45° C. to 55° C. Because the heat sink is imbedded within the DMD chip, the temperature gradient within the DMD chip is drastically reduced in comparison to related art DMD chips. This temperature may also depend on the laser power as well as the coolant temperature, as well understood by a skilled artisan. If the measured temperature is not above the threshold temperature, the method 200 may return to step S204 and continue monitoring the temperature of the DMD. However, if the temperature is above the threshold temperature, then the method 200 may proceed to step S208.

At step S208, the method 200 may provide a coolant into and through the DMD chip. For example, the coolant may be a cooling fluid pumped into the coolant inlet line, manifold and inlet conduit via the coolant circulation system and introduced to the heat sink. Heat may be conducted away from the array of DMD pixels and other DMD components through the heat sink and out of the DMD with the coolant exiting the DMD via the outlet conduit. At optional step S210, the method 200 may continue to measure the temperature of the DMD. If the temperature of the DMD remains above the threshold, the method 200 may loop back to step S208 and continue to cool the DMD via the coolant delivered through the channel within the heat sink. However, if the temperature of the DMD is below the threshold, the method 200 may continue to optional step S212, where the method may stop the coolant from flowing through the DMD. At step S214, the method 200 ends. The method 200 may loop indefinitely from Step S212 back to Step S504 while the LIM is operating for continuous monitoring and temperature control of the DMD.

It should be noted that although not explicitly specified, one or more steps, functions, or operations of the method 200 described above may include a storing, displaying and/or outputting step as required for a particular application. In other words, any data, records, fields, and/or intermediate results discussed in the method 200 can be stored, displayed, and/or outputted to another device as required for a particular application. Furthermore, steps, functions or operations in FIG. 13 that recite a determining operation or involve a decision do not necessarily require that both branches of the determining operation be practiced. In other words, one of the branches of the determining operation can be deemed as an optional step. In addition, one or more steps, functions or operations of the above described method 200 may comprise optional steps, or can be combined, separated, and/or performed in a different order from that described above, without departing from the example embodiments of the present disclosure. Furthermore, the use of the term "optional" in the above disclosure does not mean that any other steps not labeled as "optional" are not optional. As such, any claims not reciting a step that is not labeled as optional is not to be deemed as missing an essential step, but instead should be deemed as reciting an embodiment where such omitted steps are deemed to be optional in that embodiment.

Figure 14:
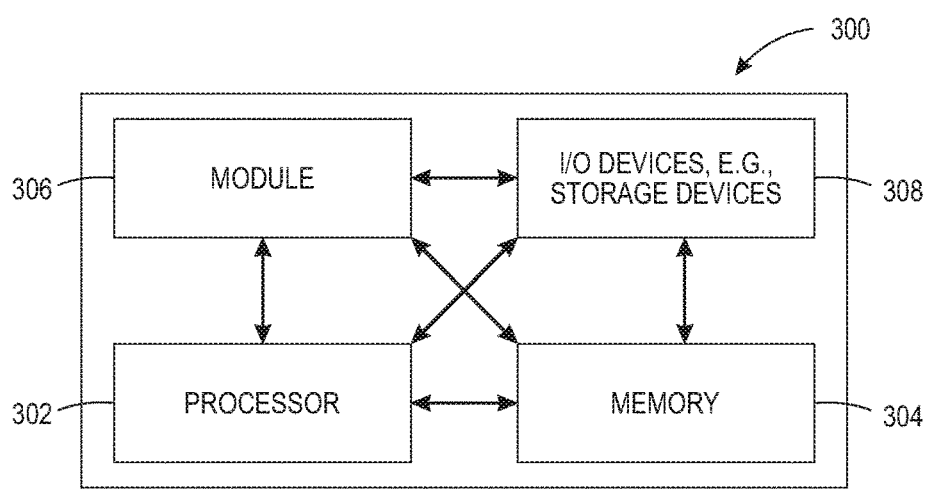
FIG. 14 illustrates a high-level block diagram of a computer suitable for use in performing functions described herein.

FIG. 14 depicts a high-level block diagram of a computer 300 that is dedicated to perform the functions described herein. As depicted in FIG. 14, the computer 300 may include one or more hardware processor elements 302 (e.g., a central processing unit (CPU), a microprocessor, or a multi-core processor), a memory 304 (e.g., random access memory (RAM) and/or read only memory (ROM)), a module 306 for cooling a digital mirror device, and various input/output devices 308 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 308 for cooling a digital mirror device (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 306 for cooling a digital mirror device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

Those skilled in the art will appreciate that other embodiments of the disclosed subject matter may be practiced with many types of image forming elements common to lithographic image forming systems in many different configurations. It should be understood that these are non-limiting examples of the variations that may be undertaken according to the disclosed schemes. In other words, no particular limiting configuration is to be implied from the above description and the accompanying drawings. For example, although the coolant lines 18 are shown as being run laterally or horizontally into the coolant conduit manifold 30, it should be noted that the coolant lines may be run vertically into the manifold. The coolant lines 18 may be located below the coolant conduit manifold 30 and enter from a bottom side of the manifold rather than the lateral sides of the manifold. Running the coolant lines 18 vertically may help remove some turns that may help reduce the overall pressure drop within the coolant lines. Overall, removing as many turns as possible may help reduce the overall pressure drop within the coolant lines whether the coolant lines are run horizontally or vertically into the coolant conduit manifold 30. In addition, while the manifold 30 is shown generally in block form, it is understood that the structure of the manifold is not limited to any particular shape, as the manifold is understood to be a fitting or like structure that connects the coolant lines 18 to the inlet and outlet conduits 36, 38 and directs the coolant there through. The coolant inlet line 24 may include the inlet conduit 36, or be coupled to or otherwise transition to the inlet conduit via the manifold 30. Similarly, the coolant outlet line 24 may include the outlet conduit 38, or be coupled to or otherwise transition to the outlet conduit via the manifold.

The exemplary depicted sequence of executable method steps represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIGS. 11-12, and the accompanying description, except where any particular method step is reasonably considered to be a necessary precondition to execution of any other method step. Additionally, not all of the depicted and described method steps need to be included in any particular scheme according to disclosure.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A Digital Micromirror Device (DMD), comprising:
   a housing having a back wall and side walls ascending from the back wall, the housing including a front window spatially offset from the back wall and defining an interior therebetween;
   an array of DMD pixels hermetically sealed within the housing, each pixel having a micromirror configured to tilt independently towards a light source in a projection system and away from the light source; and
   a heat sink between the array of DMD pixels and the back wall of the housing with both the heat sink and the array in the interior of the housing, the heat sink including a channel there through, the channel having an inlet port and an outlet port configured for fluid communication with a coolant source having a coolant, the channel configured to convey the coolant within the heat sink from the inlet port through the outlet port to actively cool the array of DMD pixels.

2. The DMD of claim 1, further comprising an inlet conduit between the inlet port and the coolant source, the inlet conduit extending through the housing to provide fluid communication from the coolant source to the heat sink channel.

3. The DMD of claim 2, further comprising an outlet conduit between the outlet port and the coolant source, the outlet conduit extending through the housing to provide fluid communication from the heat sink channel to the coolant source.

4. The DMD of claim 3, wherein at least one of the inlet conduit and the outlet conduit extend through the back wall of the housing.

5. The DMD of claim 3, wherein at least one of the inlet conduit and the outlet conduit extend through one of the side walls of the housing.

6. The DMD of claim 1, further comprising an epoxy border between the side walls of the housing and the front window of the housing, the epoxy border configured to hermetically bond the front window to the side walls.

7. The DMD of claim 1, further comprising a substrate attached to the array of DMD pixels and extending from the array along the plane of the array.

8. The DMD of claim 7, further comprising a bezel between the front window of the housing and the substrate, the bezel configured to maintain a spatial gap between the array of DMD pixels and the front window.

9. The DMD of claim 7, wherein the substrate is a silicon substrate and the front window is glass.

10. The DMD of claim 7, wherein the array of DMD pixels is fixed to the heat sink via a chemical bond between the substrate and the heat sink.

11. The DMD of claim 1, wherein the heat sink is a copper heat sink.

12. The DMD of claim 1, wherein the coolant source is external of the housing.

13. A method of manufacturing a Digital Micromirror Device (DMD) having a housing with a back wall, side walls ascending from the back wall and a front window, an array of DMD pixels hermetically sealed within the housing, and a heat sink between the array of DMD pixels and the back wall of the housing, the method comprising:
   attaching the array of DMD pixels to the heat sink, the heat sink including a channel there through with an inlet port and an outlet port, the channel configured to convey a coolant within the heat sink from the inlet port through the outlet port to actively cool the array of DMD pixels;
   inserting the array of DMD pixels and the heat sink into the housing, with the heat sink adjacent the back wall;
   placing the front window above the array of DMD pixels opposite the back wall; and
   hermetically sealing the array of DMD pixels within the housing.

14. The method of claim 13, further comprising coupling the inlet port to a coolant source via an inlet conduit extending through the housing, and coupling the outlet port to the coolant source via an outlet conduit extending through the housing, the coolant source providing the coolant to the channel.

15. The method of claim 14, the step of coupling the inlet port to the coolant source via the inlet conduit including extending the inlet conduit through the back wall of the housing.

16. The method of claim 14, the step of coupling the outlet port to the coolant source via the outlet conduit including extending the outlet conduit through one of the side walls of the housing.

17. The method of claim 13, the step of hermetically sealing the array of DMD pixels within the housing including fixing an epoxy border between the side walls of the housing and the front window of the housing, the epoxy border hermetically bonding the front window to the side walls.

18. The method of claim 13, wherein the array of DMD pixels is attached to a substrate surrounding the array of DMD pixels, the method further comprising fixing a bezel between the front window of the housing and the substrate to maintain a spatial gap between the array of DMD pixels and the front window to hold the array of DMD pixels in lateral position within the housing.

19. The method of claim 13, further comprising chemically bonding the array of DMD pixels to the heat sink by soldering a silicon substrate attached to the array about a planar periphery thereof to the heat sink.

20. A method for cooling a digital micromirror device (DMD) chip, the DMD chip including a housing having a back wall and side walls ascending from the back wall, the housing including a front window spatially offset from the back wall and defining an interior therebetween, an array of DMD pixels hermetically sealed within the housing, each pixel having a micromirror configured to tilt independently towards a light source in a projection system and away from the light source, and a heat sink between the array of DMD pixels and the back wall of the housing with both the heat sink and the array in the interior of the housing, the heat sink including a channel there through, the channel having an inlet port and an outlet port configured for fluid communication with a coolant source having a coolant, the channel configured to convey the coolant within the heat sink from the inlet port through the outlet port to actively cool the array of DMD pixels, comprising:
  measuring a temperature of the DMD with a temperature sensor;
  determining that the temperature of the DMD is above a threshold; and
  providing a coolant into and through the DMD chip.

* * * * *